United States Patent Office 3,213,033
Patented Oct. 19, 1965

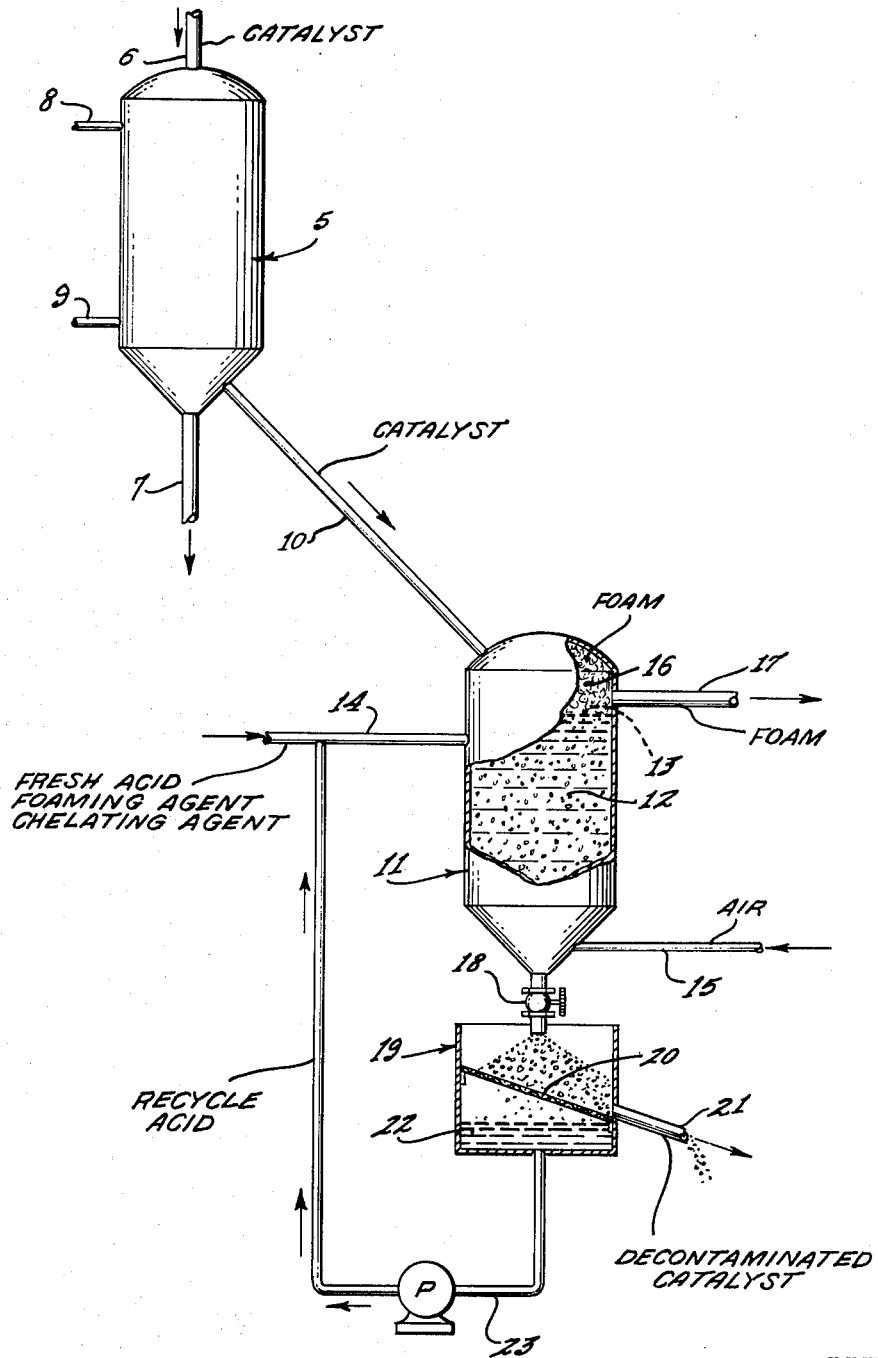

3,213,033
METHOD OF REMOVING METALLIC CONTAMINANTS FROM PARTICULATE SOLID CATALYST
Saul G. Hindin, Wilmington, Del., and Harold Shalit, Drexel Hill, Pa., assignors to Air Products and Chemicals, Inc., Philadelphia, Pa., a corporation of Delaware
Filed Nov. 9, 1962, Ser. No. 236,635
10 Claims. (Cl. 252—413)

This invention relates to a method of removing contaminants from particulate solid catalyst of the type commonly employed to promote hydrocarbon conversions, such as the catalytic cracking, hydrocracking, dehydrogenation, polymerization, etc., of hydrocarbon charge stocks.

The problem of catalyst contamination by the gradual deposition, during the reaction period, of heavy metals initially present in the hydrocarbon charge stock is well known in the petroleum refining and chemical processing arts. Heavy metals, such as nickel and vanadium, etc., and the oxides thereof, are generally present in hydrocarbon charge stocks, particularly in gas oil or in a gas oil distillate. Even when processing charge stocks which contain relatively small amounts of heavy metals, the catalyst may become contaminated with these and other heavy metals introduced through the processing equipment, or inadvertently in other ways.

However obtained, the deposition of heavy metal contaminants upon the catalyst particles eventually renders the catalyst unsuitable for further use, and the catalyst must either be decontaminated by removal of the metal deposit or be replaced with fresh catalyst.

In fixed bed catalytic processes employing large bodies or masses of granular catalystic material, wherein the catalyst is regenerated in situ by combustion of the coke deposited on the catalyst during the conversion phase of a cyclic operation, the regeneration treatment does not satisfactorily remove the metallic contaminants. Decontamination with respect to such metals therefore requires removal of the entire body of catalyst for such treatment.

In moving bed systems employing a continuously circulating body of granular catalyst which gravitates along a downflow path, including the treating zones and the connecting downflow conduits, as a compact moving bed or column, or in so-called fluidized systems employing a continuously circulating fluidized mass of finely-divided catalyst particles, the decontamination treatment for removal of contaminants, such as the aforesaid metals, may be accomplished by temporary removal of a side stream of regenerated catalyst from the main circulatory path. After suitable treatment to remove substantially all the metallic contaminants, or at least to establish an equilibrium minimum concentration of such contaminant metals, the treated catalyst may be returned to the main circulatory path.

It is well known that various impurities in an aqueous solution can be considerably reduced in concentration or substantially eliminated from the solution by a process or technique which comprises a foaming operation wherein the solution is contacted with a surface-active complexing agent and with a stream of inert gaseous material. The resultant foam provides a considerable increase in the total surface area, at which area the active material tends to concentrate. Removal of the foam removes therewith the active material. Such removal may be either for the purpose of recovering the removed active material or for the purpose of purifying the solution.

The present invention contemplates the beneficial application of the foregoing technique to certain chemical processes, including hydrocarbon treating processes such as catalytic cracking, hydrocracking, reforming, dehydrogenation, etc., employing metallic or metallic oxide catalysts. Such application may be for the purpose of removing undesirable metallic contaminants or for recovering valuable metallic components.

In accordance with the invention, particulate solid catalyst containing acid-soluble metallic components is treated for removal of such metal, either as contaminants or as reusable material, by continuously introducing a stream of the catalyst particles to be treated into a vertically-elongated, confined treating zone in which there is maintained a body of dilute acid containing foaming and complexing or chelating agents, separately or combined in a single molecule. The catalyst particles gravitate through the body of aqueous acid, and both the liquid and the solids are removed at the bottom of the treating zone. The body of liquid is continuously recirculated, and fresh acid, and fresh foaming and complexing or chelating agent are continuously supplied to the treating zone, as needed, for replacement. The treating zone is maintained substantially at atmospheric conditions, the temperature not exceeding 100° C.

Air or other gaseous material is continuously introduced at the bottom of the treating zone and bubbles upwardly through the body of liquid thereby forming a layer of foam at the surface. An overflow outlet is provided at the top of the treating zone whereby the foam which is continuously formed by the action of the gas stream upon the liquid is continuously removed.

In passing downwardly with the liquid through the treating zone, the metal-containing solids are acted upon by the acid to dissolve the metals from the surface of the solids in the form of the corresponding ions which become associated in the chelate. The action of the gaseous material upon the liquid causes the formation of a foam in which the metallic ions become concentrated. The foam containing the metallic ions rises to the surface of the liquid body, maintained at a level just below the overflow passage.

Controlled withdrawal of the solids and the liquid is effected at the bottom of the treating zone, with liquid-solids separation at or immediately below the draw-off outlet. The separated, decontaminated solids, completely drained of free liquid, are subsequently dried with or without prewashing, and may then be returned to the circulating body of solids from which they were initially withdrawn. The separated acid is collected as a body of recycle liquid and is continuously pumped back into the treating zone with the incoming fresh supply of foaming and chelating agents and replacement acid.

In a typical operation according to the invention the catalyst to be treated may contain acidic oxides, certain metal oxides, or other acid-soluble materials. The aqueous medium may comprise any of the inorganic mineral acids or water-soluble organic acids of comparable strength, for example, hydrochloric acid, phosphoric acid, trifluoroacetic acid, etc. The aqueous acid concentration should be such that the materials to be removed are at least partially dissolved or removed from the solids. The acid solution should have a pH value of about 2.0 to 4.5.

The surface active material may be one of the known cationic surfactants, such as, cetyl amine, dimethyl laurylamine, 1-amino-4-octyl-cyclohexane, etc. or one of the known nonionic surfactants, such as glycerol monostearate, sorbitol monooleate, tetrapropylene etherglycol, or a polyethyleneetherglycol derivative of sorbitol having a molecular weight of about 300.

The chelating agent may be ethylenediamine tetraacetic acid or other known chelating agents; or, a combination, single-molecule, foaming and chelating agent may be employed, for example, N,N'-dioctylethylenediamine N,N'-diacetic acid (U.S. Pat. No. 2,532,391); 4,5-dioctyl-1,2-(bisacetic acid amino) cyclohexane; N,N'-di(2-iminodiethanolethoxyethyl) ethylenediamine diacetic acid (U.S.

Pat. No. 2,673,213); or terminal amino tetraacetic acid derivatives of pentaalkyleneether (U.S. Pat. No. 2,709,178).

For a fuller understanding of the invention reference may be had to the following description and claims taken in connection with the accompanying drawing forming a part of this application and illustrating the application of a catalyst treated to a processing system employing a moving mass of catalyst requiring periodic regeneration for removal of surface contaminants including deposited metals, such as, nickel, vanadium, iron, copper, sodium, etc.

In the drawing, the vessel 5 represents a treating vessel of a chemical processing system employing a continuously circulating body of particulate solid material employed as a catalyst. The vessel 5, as well as its associated inlet and outlet conduits, is merely diagrammatical and is intended to represent any of a number of well-known processing vessels through which particulate solids may be circulated, either as a compact moving mass or as a fluidized mass. For convenience of description, the vessel is illustrated as having a catalyst inlet 6 at the top and a main catalyst outlet 7 at the bottom. The vessel 5 is internally arranged in known manner, not shown, to maintain a large mass of the catalyst in the form of a moving bed. Reactant gaseous material is passed in a constant stream through the catalyst bed by means of conduits or nozzles 8 and 9 located at the side of the vessel 5 near its upper and lower ends, respectively. Flow of the gaseous reactant may be in either direction, as is well known to the art.

In the application of the invention to any of a number of well known hydrocarbon conversion processes, the vessel 5 would preferably be a regenerator wherein carbonaceous material formed on the catalyst in a conversion zone, not shown, is removed by combustion in what is known as a regeneration treatment. While the carbonaceous material may to a major extent be removed by such combustion, there may still remain upon the surface of the catalyst any of a number of contaminant metals derived from the charge stock treated in the conversion zone. Hereinafter the solids to be decontaminated will be considered as such regenerated catalyst.

In order to remove the contaminant metals a side stream of regenerated catalyst is continuously withdrawn by gravity flow from the bottom region of vessel 5 through a conduit 10, which discharges the withdrawn catalyst into the upper end of an elongated cylindrical vessel 11 forming the decontamination zone.

The vessel 11 is partially filled with a constantly replenished body of aqueous acid solution 12 containing foaming and chelating materials or agents in the form of a single compound or separate compounds. The body of liquid in vessel 11 is maintained at a constant approximate level indicated by the horizontal broken line 13. Liquid is supplied to the body of liquid 12 through inlet conduit 14. Fresh aqueous acid solution, initial and replacement, as well as the foaming and chelating agents, are supplied from sources, not shown, through conduit 14. Also entering vessel 11 through conduit 14 is a constant stream of recycle acid supplied through conduit 23, as will hereinafter be described.

The catalyst particles entering vessel 11 from conduit 10 gravitate through the body of liquid 12 to settle at the bottom of the vessel. Air or other gaseous material is constantly introduced into the bottom region of vessel 11 through inlet conduit 15. The air passing upwardly through the body of liquid 12 causes a continuous foaming action within the liquid body, thereby greatly increasing the surface area of the liquid. Metallic ions formed by the reaction of the acid on the contaminant metals become concentrated at the surface area and are carried to the surface of the body of liquid upon which there is formed a body of foam 16 which occupies substantially all the region of vessel 11 above the surface 13 of the liquid body 12. Under the combined action of the rising stream of air and the continuous production of foam there is a constant overflow of foam through the outlet 17. The foam carries with it the metallic ions which, if metal recovery is the object, are readily converted to the pure metal in known manner in a subsequent operation, not shown.

The bottom of vessel 11 is provided with a valve-controlled outlet 18 through which solids and liquid are continuously withdrawn from vessel 11. The discharging stream of solids and liquid are received by a vessel 19 directly beneath the outlet 18 and are deposited upon a sloping screen 20. The solids roll downwardly along the sloping screen surface to the side of vessel 19 where they are separately removed through discharge conduit 21.

The liquid passing through screen 20 collects in a pool 22 at the bottom of vessel 19 and is constantly withdrawn for recycle to conduit line 14 through conduit line 23 under the action of pump 24.

As discharged from vessel 19 the decontaminated solids are in wet condition. The decontaminated catalyst is suitable for reuse and may be reintroduced into the circulatory system from which it was withdrawn. If temporary storage of the decontaminated catalyst is desired the catalyst may dry out naturally, but if immediate reintroduction is desired the catalyst may be subjected to known rapid drying treatment. It is therefore to be understood that conduit 21 may convey the decontaminated catalyst to temporary storage or to a drying zone in the path of flow back into the circulatory system.

Obviously, many modifications and variations of the invention as hereinbefore set forth may be made without departing from the spirit and scope thereof, and therefore only such limitations should be imposed as are indicated in the appended claims.

What is claimed is:

1. The method of removing metallic contaminants from particulate solid catalyst as a continuous process, which comprises the steps of:

(a) introducing an aqueous acid solution containing a chelating agent and an organic surface-active foaming agent from the group consisting of nonionic and cationic surfactants into a confined treating zone wherein said solution is maintained as a relatively deep liquid body of substantially constant depth;

(b) introducing the solid particles of metal-contaminated catalyst into the region of said zone above the surface of said liquid body so as to gravitate into and through said liquid body, said metallic contaminants being dissolved in said acid solution to form the corresponding metallic ions which then react with said chelating agent to form the corresponding chelate;

(c) introducing within the bottom region of said liquid body an inert gaseous material which bubbles upwardly therethrough and coacts with said foaming agent to form a layer of foam at the surface of said liquid body, said foam having concentrated therein the chelate containing the metallic ions formed by the reaction between said metallic contaminants and said acid;

(d) collecting the metallic ion-containing foam in the upper region of said zone upon the surface of said liquid body and continuously removing the same from said zone as overflow;

(e) continuously withdrawing a mixed stream of liquid and decontaminated catalyst particles from the bottom of said treating zone;

(f) separating said decontaminated catalyst from said liquid for subsequent additional treatment to render it suitable for reuse;

(g) and returning said liquid as recycle solution to said treating zone.

2. The method of claim 1 in which said aqueous acid solution has a pH value in the range of 2–4.5.

3. The method of claim 2 in which said aqueous acid solution is an inorganic mineral acid.

4. The method of claim 2 in which said aqueous acid solution is a water-soluble organic acid.

5. The method of claim 2 in which said surface active foaming agent is a cationic surfactant.

6. The method of claim 2 in which said surface active foaming agent is a non-ionic surfactant.

7. The method of claim 2 in which said chelating agent is ethylene diamine tetraacetic acid.

8. The method of claim 2 in which the components providing said foaming and chelating functions are combined in a single molecule.

9. The method of claim 1 in which said treating zone is part of a chemical processing system wherein said particulate solid catalyst is continuously circulated through a closed path, including a reaction zone, in which said catalyst receives a deposit of metallic contaminants; said contaminated catalyst is continuously passed as a sidestream from said closed circulatory path to said treating zone; and said decontaminated catalyst is continuously returned to said circulatory path.

10. The method of claim 9 including the step of drying said decontaminated catalyst following its separation from said liquid and prior to its return to said circulatory path.

References Cited by the Examiner

UNITED STATES PATENTS 3,020,239  2/62  Flinn _____ 252—413

MAURICE A. BRINDISI, *Primary Examiner.*